United States Patent
Vining et al.

(10) Patent No.: US 11,428,094 B2
(45) Date of Patent: Aug. 30, 2022

(54) WIRELESS LOAD CELL MONITORING SYSTEM AND METHOD

(71) Applicant: Interface, Inc., Scottsdale, AZ (US)

(72) Inventors: Ken Vining, Carefree, AZ (US); Jay Bradley, Scottsdale, AZ (US); Ronan Reynolds, Phoenix, AZ (US); Philip Richard Ouellette, Phoenix, AZ (US); James Richardson, Scottsdale, AZ (US)

(73) Assignee: Interface, Inc., Scottsdale, AZ (US)

( * ) Notice: Subject to any disclaimer, the term of this patent is extended or adjusted under 35 U.S.C. 154(b) by 0 days.

(21) Appl. No.: 16/876,032

(22) Filed: May 16, 2020

(65) Prior Publication Data

US 2021/0355810 A1 Nov. 18, 2021

(51) Int. Cl.
*E21B 47/009* (2012.01)
*H04W 4/80* (2018.01)
*H04W 76/10* (2018.01)

(52) U.S. Cl.
CPC ............. *E21B 47/009* (2020.05); *H04W 4/80* (2018.02); *H04W 76/10* (2018.02)

(58) Field of Classification Search
CPC ....... E21B 47/009; H04W 4/80; H04W 76/10; H04W 4/021; G01R 31/392; G01R 31/3647; G01R 31/3648; G01R 31/367; G01R 31/3679; G01R 31/3689; G01R 31/371; G01R 31/374; G01R 31/379; G01R 31/382; G01R 31/396; F02N 11/0862; F02N 2200/063; F02N 2200/064; G01K 3/08; G01W 1/00; G06F 1/28; G06F 3/0482; G06F 3/0484; G06Q 10/06315; G06Q 50/06; G08B 13/1418; G08B 25/001; G08B 13/1454; H01M 10/06; H01M 10/425; H01M 10/4257; H01M 10/48; H01M 10/482; H01M 10/486; H01M 10/488; H01M 2010/4271;
(Continued)

(56) References Cited

U.S. PATENT DOCUMENTS

2001/0054322 A1* 12/2001 Sommerfeld ............. G01L 5/20
  73/862.325
2005/0002353 A1* 1/2005 Horneman .......... H04W 88/085
  370/329

(Continued)

*Primary Examiner* — Hai Phan
*Assistant Examiner* — Anthony D Afrifa-Kyei
(74) *Attorney, Agent, or Firm* — Spencer Fane LLP; Steven J. Laureanti

(57) ABSTRACT

A wireless load cell monitoring system and method may comprise a remote load cell assembly and a base station. Embodiments of the remote load cell assembly comprise a remote processor, a remote memory, a battery, a remote transceiver, an analog-to-digital converter, and a load cell. Embodiments of the base station comprise a base processor, a base memory, a base transceiver, and a digital-to-analog converter. Embodiments of the remote load cell assembly pair with the base station using a wireless communication protocol, read analog voltage data from the load cell, convert the load cell analog voltage data into digital load data, and transmit the digital load data to the base station. Embodiments of the base station convert the digital load data into analog voltage data and output the analog voltage data.

12 Claims, 8 Drawing Sheets

(58) Field of Classification Search
CPC ......... H01M 2010/4278; H01M 50/576; H02J 7/0047; H02J 2007/0067; H02J 7/0063; H04L 67/10; Y02E 60/10
See application file for complete search history.

(56) References Cited

U.S. PATENT DOCUMENTS

| | | | |
|---|---|---|---|
| 2008/0047363 A1* | 2/2008 | Arms | H02J 7/345 |
| | | | 73/862 |
| 2011/0285527 A1* | 11/2011 | Arms | G07C 5/085 |
| | | | 340/539.1 |
| 2013/0265058 A1* | 10/2013 | Danner | G01R 31/3835 |
| | | | 324/433 |
| 2018/0217015 A1* | 8/2018 | Baker | G01L 5/0061 |

* cited by examiner

WIRELESS LOAD CELL MONITORING SYSTEM AND METHOD

TECHNICAL FIELD

The present disclosure relates generally to systems and methods for force measurement, and more specifically to a system and method to measure, transmit, and receive load cell data and other analog and digital data wirelessly.

BACKGROUND

Load cells may be configured to monitor, among other forces, compression and pressure forces. Load cells may transmit analog voltage data corresponding to load compression and pressure to one or more monitoring systems using cables. However, mounting load cells to objects in motion, such as the polished rod of an operating pumpjack extracting oil from an oil well, presents several difficulties. The cable connecting a wired load cell to the monitoring system may tangle with or break against the pumpjack polished rod. Wireless load cells, on the other hand, may rapidly deplete onboard battery charges and may be located in hazardous environments which make it difficult to access the load cell to change the battery, and may also have difficulty transmitting load cell data to the correct monitoring system in an environment in which several wireless load cells are operating on the same frequencies.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to more detailed descriptions presented below.

In embodiments of the disclosed subject matter, the unique systems and methods described herein make use of an exemplary wireless load cell monitoring system and method to transmit load cell signals and other analog or digital signals from a remote load cell assembly to a base station using one or more wireless communication protocols.

In embodiments of the disclosed subject matter, the system and method described herein can provide a remote load cell assembly that includes a remote processor, remote memory, a battery, a remote transceiver, an analog-to-digital converter, and a load cell. The system and method described herein can provide a base station that includes a base processor, a base memory, a base transceiver, and a digital-to-analog converter.

In an embodiment, the remote load cell assembly pairs with the base station using one or more wireless communication protocols. The remote load cell assembly reads analog voltage data from the load cell, converts the load cell analog voltage data into digital load data, and transmits the digital load data from the remote load cell assembly to the base station using one or more wireless communication protocols. The base station converts the digital load data into analog voltage data that emulates the original analog voltage data generated by the load cell. The base station outputs the analog voltage data.

These and other features of the disclosed subject matter are described in greater detail below.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
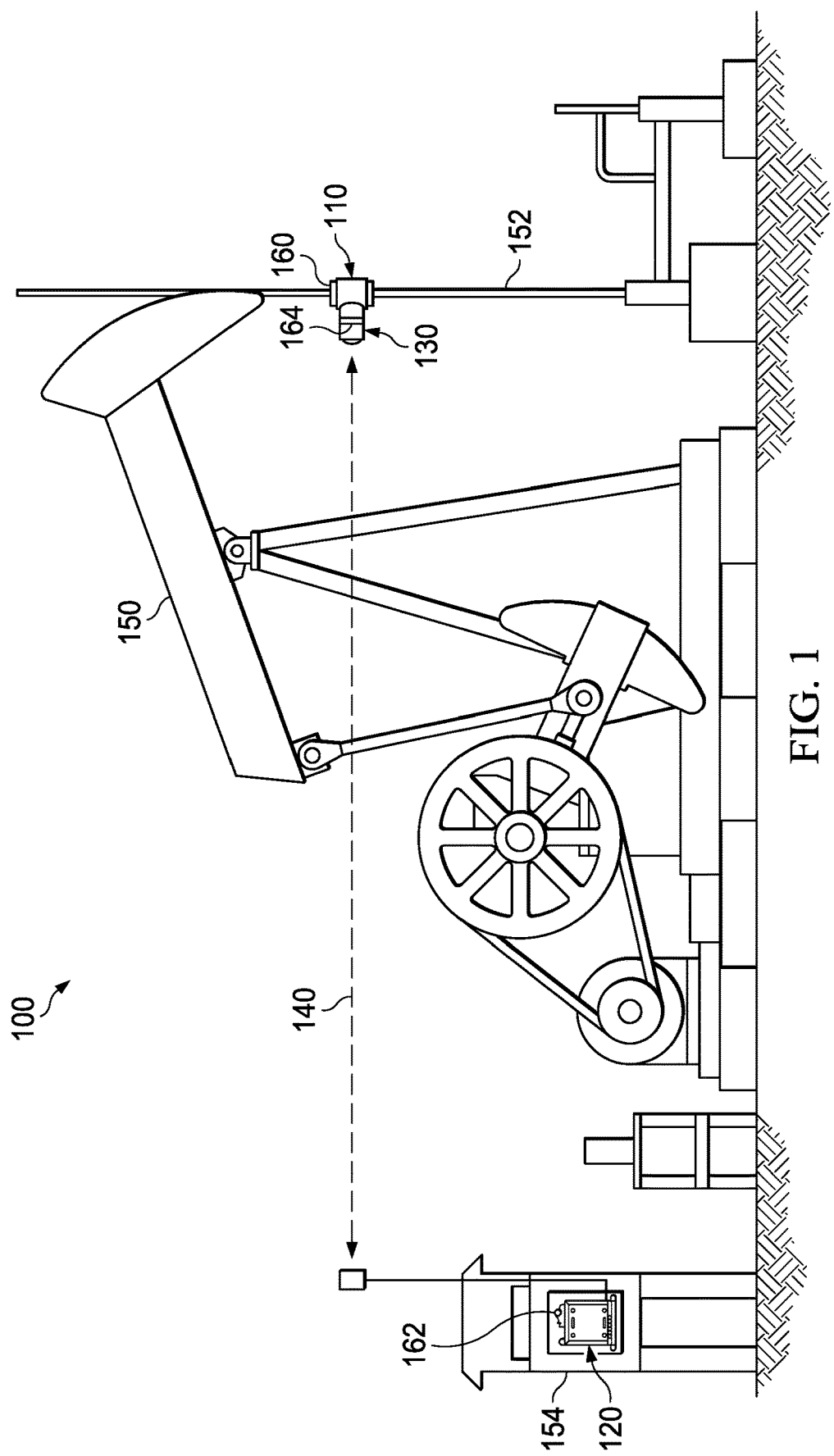
FIG. 1 illustrates an exemplary wireless load cell monitoring system, in accordance with an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully herein, embodiments of the following disclosure relate to a system and method to monitor, transmit, and receive load cell signals wirelessly. Embodiments of a wireless load cell monitoring system may comprise a remote load cell assembly in wireless communication with a base station. The remote load cell assembly may draw electric current from a battery in a connected battery compartment and may read analog voltage data from one or more load cells corresponding to physical load pressure. The remote load cell assembly may convert the analog voltage data into digital load data using an analog-to-digital converter, and may transmit the digital load data to the base station using one or more wireless communication protocols, including but not limited to low power wireless packet protocols. According to embodiments, the base station may use an emulator to convert the received digital load data into analog voltage data for output through one or more analog output channels, thereby emulating the original analog voltage signal read by the remote load cell assembly load cell. The base station may also output digital data using one or more digital output channels. In an embodiment, the remote load cell assembly may pair to the base station using a pairing protocol, and one or more remote load cell assemblies may be capable of pairing with, and sending data to, one or more separate base stations, according to particular needs.

Embodiments of the following disclosure permit remote load cell assemblies to operate in, and wirelessly transmit data from, hazardous in-motion environments for extended periods of time i.e., up to one year or more, of constant operation without requiring battery changes or complicated wired mounting systems to deliver power to the remote load cell assembly. Embodiments quickly and efficiently pair remote load cell assemblies to base stations in environments in which multiple separate remote load cell assemblies and base stations are in current operation. Embodiments transmits analog voltage data that emulates original analog voltage data read by remote load cell assemblies.

FIG. 1 illustrates exemplary wireless load cell monitoring system 100, according to an embodiment. Wireless load cell monitoring system 100 comprises remote load cell assembly 110, base station 120, battery compartment 130, wireless communication 140 between remote load cell assembly 110 and base station 120, pumpjack 150, and connectors 160-164. Although wireless load cell monitoring system 100 is illustrated and described herein comprising a single remote load cell assembly 110, a single base station 120, a single battery compartment 130, wireless communication 140, a single pumpjack 150, and connectors 160-164, embodiments contemplate any number of remote load cell assemblies 110, base stations 120, battery compartments 130, wireless communications 140, pumpjacks 150, and connectors 160-164, according to particular needs. In addition, although wireless load cell monitoring system 100 is described and illustrated operating to read and transmit load pressure from pumpjack 150, wireless load cell monitoring system 100 is no way restricted exclusively to pumpjack 150 applications. Embodiments contemplate wireless load cell monitoring system 100 remote load cell assembly 110 reading load cell analog voltage data of any type or configuration, and/or digital data measured by one or more digital sensors, according to particular needs.

In an embodiment, remote load cell assembly 110 comprises one or more processors, memory, and other components configured to read analog voltage data from one or more sensors, including but not limited to one or more load cells, corresponding to physical load pressure at the location of remote load cell assembly 110. Remote load cell assembly 110 may convert the analog voltage data into digital load data and may store the digital load data in onboard memory of remote load cell assembly 110. Remote load cell assembly 110 may also read digital measurement data from one or more digital sensors, including but not limited to temperature data, accelerometer data, and battery voltage data, and may store the digital measurement data in remote load cell assembly 110 onboard memory. Remote load cell assembly 110 may transmit the digital load data and/or the digital measurement data to base station 120 using one or more wireless communication 140 protocols, including but not limited to Enhanced ShockBurst (ESB) wireless data packet protocol.

According to embodiments, remote load cell assembly 110 may comprise a sealed housing within which various components are mounted, as described in greater detail below. Remote load cell assembly 110 sealed housing may permit remote load cell assembly 110 to operate in a Zone 0, 1, or 2 hazardous gas, hazardous vapor, or hazardous mist environment.

In an embodiment, base station 120 comprises one or more processors, memory, and other components configured to receive wireless transmissions and wireless data from remote load cell assembly 110 and to generate analog voltage output and/or digital output in response to the wireless transmissions and wireless data. In an embodiment, base station 120 may receive digital load data and/or digital measurement data transmitted by remote load cell assembly 110 over one or more wireless communication 140 protocols. Base station 120 may store digital load data and/or digital measurement data in base station 120 memory. Base station 120 may convert digital load data into analog voltage data, which base station 120 may output through one or more output channels, thereby emulating the original analog voltage data read by remote load cell assembly 110. Base station 120 may also use digital measurement data, including but not limited to digital temperature data and/or battery voltage data, to estimate, using one or more algorithms, the remaining battery life of one or more battery compartment 130 batteries.

In an embodiment, battery compartment 130 may connect to remote load cell assembly 110 using connector 164. Battery compartment 130 may comprise a battery, including but not limited to a lithium thionyl chloride battery supplying 3.6 volts to stimulate one or more load cells, sensors, and/or Wheatstone bridges mounted to remote load cell assembly 110. Battery compartment 130 provides remote load cell assembly 110 with electrical current to operate one or more remote load cell assembly 110 components. In an embodiment, remote load cell assembly 110 comprises one or more power management features, such as but not limited to the activation and deactivation of remote load cell assembly 110 components at defined periods of time, that enable a battery (such as but not limited to a Vitzrocell SB-D02, Tadiran TL-4930, or Xeno XL-205F battery) inserted into battery compartment 130 to power remote load cell assembly 110 for extended periods of time.

Remote load cell assembly 110 may communicate with base station 120 using wireless communication 140. Wireless communication 140 may comprise one or more wireless communication protocols, including but not limited to Enhanced ShockBurst (ESB) wireless data packet protocol, Bluetooth protocol, and/or ZigBee low-power wireless network standard. Wireless communication 140 between remote load cell assembly 110 and base station 120 may be configured to utilize very low power overhead burst transmission protocols to reduce remote load cell assembly 110 battery depletion and to minimize necessary transceiver power. In an embodiment, remote load cell assembly 110 may collect one or more sensor readings at a frequency of one hundred times a second and may transmit the one or more sensor readings to base station 120 digitally at a frequency of fifty times a second, to conserve remote load cell assembly 110 battery power. In other embodiments, remote load cell assembly 110 may collect one or more sensor readings, and may transmit one or more sensor readings to base station 120, at any frequencies. In an embodiment, remote load cell assembly 110 may (1) collect one or more sensor readings 3,200 times a second, (2) average each 64 sequential sensor readings into a single mean data point, and (3) transmit mean data points to base station 120 fifty times a second.

According to embodiments, pumpjack 150 may comprise an overground drive device to power and operate a reciprocating piston pump, such as for the extraction of oil from an oil well. Pumpjack 150 may comprise a beam-type pumpjack that converts the rotary motion of a motor into vertical reciprocating motion driving polished rod 152 attached to a sucker rod configured to pump fluid vertically in a fluid column. Pumpjack 150 may also comprise pump controller box 154 that further comprises a plurality of pumpjack 150 control equipment in a non-hazardous and/or "clean" environment. Although wireless load cell monitoring system 100 is shown and described herein reading and transmitting load cell analog voltage data measured at the polished rod 152 of a pumpjack 150, as described in greater detail below, embodiments contemplate wireless load cell monitoring system 100 reading and transmitting load cell analog voltage data, any other form of analog data, and any form of digital data from any source, according to particular needs.

According to embodiments, connectors 160-164 comprise connectors, including but not limited to bolts, screws, nuts, collars, clamps, and/or wire fasteners, that join components of wireless load cell monitoring system 100. In an embodiment, connector 160 joins remote load cell assembly 110 to polished rod 152. Connector 162 joins base station 120 to pump controller box 154. Connector 164 joins battery compartment 130 to remote load cell assembly 110.

Figure 2:
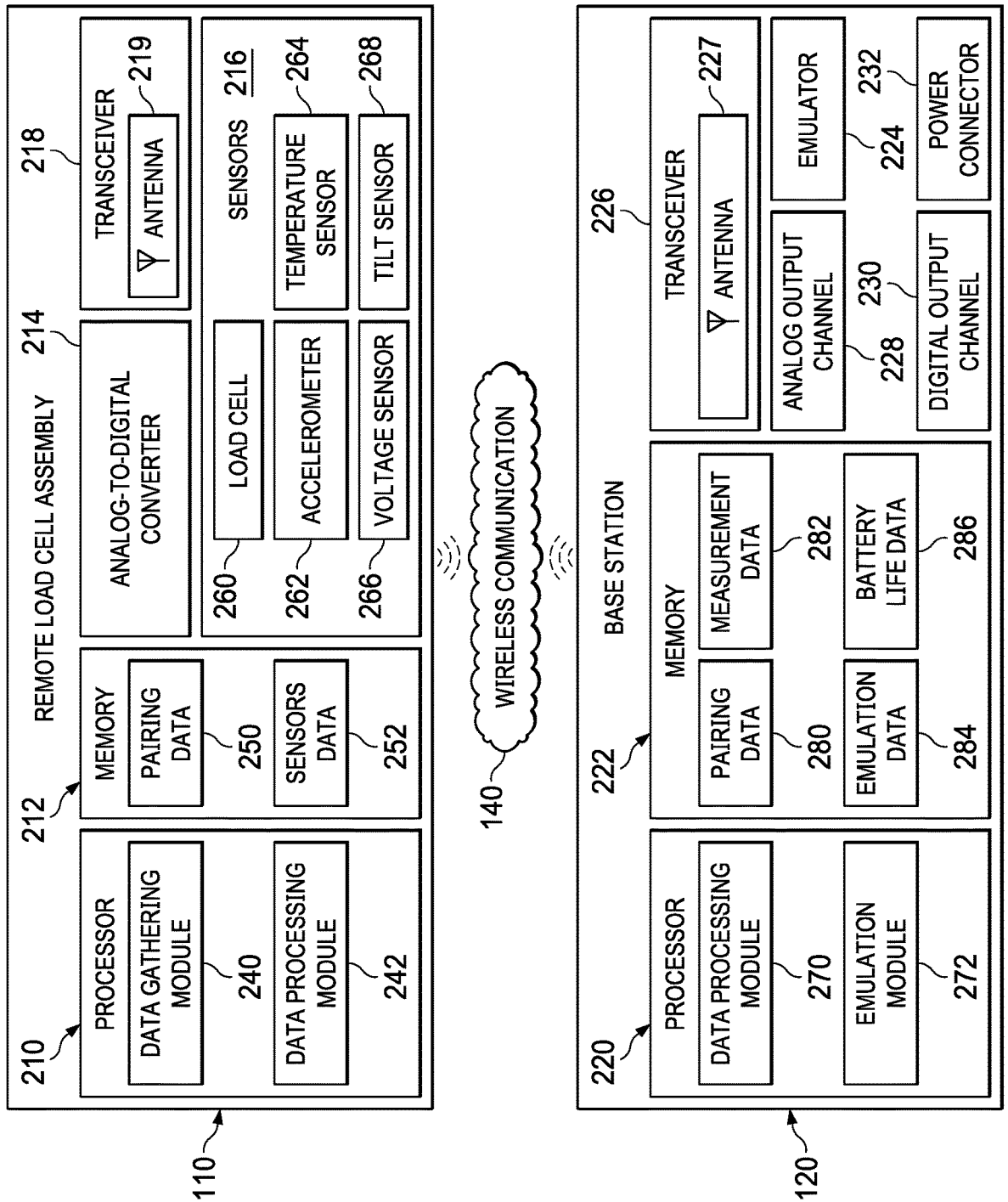
FIG. 2 illustrates the remote load cell assembly, base station, and wireless communication of FIG. 1 in greater detail, in accordance with an embodiment.

FIG. 2 illustrates remote load cell assembly 110, base station 120, and wireless communication 140 of FIG. 1 in greater detail, according to embodiment. Remote load cell assembly 110 may comprise processor 210, memory 212, analog-to-digital-converter 214, one or more sensors 216, transceiver 218, and antenna 219. Although FIG. 2 illustrates remote load cell assembly 110 comprising a single processor 210, memory 212, analog-to-digital converter 214, sensors 216, transceiver 218, and antenna 219, embodiments contemplate remote load cell assembly 110 comprising any number of processors 210, memory 212, analog-to-digital converters, sensors 216, transceivers 218, antennas 219, and/or other components according to particular needs.

In an embodiment, processor 210 comprises data gathering module 240 and data processing module 242. Although FIG. 2 illustrates processor 210 comprising a single data gathering module 240 and data processing module 242, embodiments contemplate processor 210 comprising any configuration of data gathering modules 240, data processing modules 242, and/or other modules, according to particular needs.

Data gathering module 240 may store digital measurement data from one or more sensors 216 in memory 212 sensors data 252. Data gathering module 240 may also store pairing data transmitted from base station 120 in memory 212 pairing data 250. In an embodiment, data gathering module 240 may activate and deactivate one or more sensors 216, transceivers 218, antennas 219, and/or other remote load cell assembly 110 components at defined periods (such as, for example, activating temperature sensor 264 once every five seconds to read current remote load cell assembly 110 temperature) to manage remote load cell assembly 110 power consumption and battery charge depletion. Data gathering module 240 may activate and deactivate one or more sensors 216, transceiver 218, and/or other remote load cell assembly 110 components to gather and transmit to base station 120 digital load data and/or digital measurement data once an hour, once a day, or at any other period of time to manage remote load cell assembly 110 battery consumption. By deactivating one or more sensors 216, transceivers 218, antennas 219, and/or other remote load cell assembly 110 components when the components are not in operation, data gathering module 240 may enable a standard battery (such as but not limited to a Vitzrocell SB-D02, Tadiran TL-4930, or Xeno XL-205F battery) inserted into battery compartment 130 to power remote load cell assembly 110 for an extended periods of time of continuous operation.

Data processing module 242 may access digital load data and/or digital measurement data stored in sensors data 252, and may transmit the digital load data and/or digital measurement data to transceiver 218 for transmission to base station 120.

In an embodiment, memory 212 comprises pairing data 250 and sensors data 252. Although FIG. 2 illustrates memory 212 comprising pairing data 250 and sensors data 252, embodiments contemplate memory 212 storing and retrieving data in any configuration, according to particular needs.

Pairing data 250 may comprise pairing data that permits remote load cell assembly 110 to wirelessly pair with and transmit data to base station 120. In an embodiment, pairing data 250 may comprise any form of unique device identification, including but not limited to Bluetooth device names, wireless addresses, and/or device profiles, that permits remote load cell assembly 110 to pair with and transmit data to base station 120.

Sensors data 252, in an embodiment, comprises digital load data and digital measurement data. Digital load data may comprise digital data corresponding to analog voltage data read from one or more load cells 260. In an embodiment, analog-to-digital converter 214 may read analog voltage data from one or more sensors 216 (including but not limited to one or more load cells 260), convert the analog voltage data into digital load data, and store the digital load data in sensors data 252. Sensors data 252 may also comprise digital measurement data output by one or more sensors 216, including but not limited to digital temperature data output by temperature sensor 264, digital accelerometer data output by accelerometer 262, and the like.

In an embodiment, analog-to-digital-converter 214 comprises an analog-to-digital integrated circuit configured to read analog voltage data from one or more sensors 216, including but not limited to one or more load cells 260, and to convert the analog voltage data into digital load data. Analog-to-digital converter 214 may read back a number in analog-to-digital counts and may scale the number to millivolts per volt excitation. In an embodiment, analog-to-digital converter 214 is calibrated to 2 millivolts per volt excitation, wherein maximum load applied to one or more load cells 260 is calibrated to read 2 millivolts per volt excitation. Analog-to-digital converter 214 may store the digital load data in sensors data 252. Analog-to-digital converter 214 may be calibrated on a test stand before insertion into remote load cell assembly 110. In an embodiment, analog-to-digital converter 214 is calibrated to interpret 30,000 pounds of load as 2 millivolts per volt excitation; in other embodiments, analog-to-digital converter 214 is calibrated to interpret 50,000 pounds of load as 2 millivolts per volt excitation. Analog-to-digital converter 214 is specifically calibrated to the exact load cells 260 and/or sensors 216 analog-to-digital converter 214 will operate in conjunction with remote load cell assembly 110.

In an embodiment, one or more sensors 216 comprise one or more digital or analog sensors mounted to remote load cell assembly 110 and configured to read and transmit analog and/or digital data. In an embodiment, sensors 216 comprise one or more load cells 260, accelerometers 262, temperature sensors 264, voltage sensors 266, and/or tilt sensors 268. Although FIG. 2 illustrates sensors 216 as comprising a single load cell 260, a single accelerometer 262, a single temperature sensor 264, a single voltage sensor 266, and a single tilt sensor 268, embodiments contemplate sensors 216 comprising any number or configuration of analog and/or digital sensors, according to particular needs.

Load cell 260 may comprise a force transducer configured to convert tension, compression, and/or pressure into analog voltage data. In an embodiment, load cell 260 comprises a plurality of strain gages configured in a Wheatstone bridge circuit and capable of detecting small changes in electrical resistance as a function of changing tension, compression, and/or pressure.

Accelerometer 262 may comprise a digital accelerometer configured to detect remote load cell assembly 110 acceleration and deceleration and to output digital measurement data relating to remote load cell assembly 110 acceleration and deceleration. Temperature sensor 264 may comprise a digital temperature sensor configured to read the temperature of remote load cell assembly 110. Voltage sensor 266 may comprise a digital voltage sensor configured to detect the current voltage of a battery compartment 130 battery. Tilt sensor 268 may comprise a digital sensor configured to measure tilt in one or more axes with reference to a defined reference plane.

In an embodiment, transceiver 218 comprises a transmitter configured to transmit digital data wirelessly and a receiver configured to receive digital data wirelessly. Transceiver 218 may further comprise antenna 219 configured to transmit and receive digital wireless signals to and from base station 120 at one or more frequencies and/or using one or more wireless communication 140 protocols.

According to embodiments, base station 120 may comprise processor 220, memory 222, emulator 224, transceiver 226, antenna 227, analog output channel 228, digital output channel 230, and power connector 232. Although FIG. 2 illustrates base station 120 as comprising a single processor 220, memory 222, emulator 224, transceiver 226, antenna 227, analog output channel 228, digital output channel 230, and power connector 232, embodiments contemplate base station 120 comprising any number of processors 220, memory 222, emulators 224, transceivers 226, analog output channels 228, digital output channels 230, power connectors 232, and/or other components according to particular needs.

In an embodiment, processor 220 comprises data processing module 270 and emulation module 272. Although FIG. 2 illustrates processor 220 comprising a single data processing module 270 and a single emulation module 272, embodiments contemplate processor 210 comprising any configuration of data processing modules 270, emulation modules 272, and/or other modules, according to particular needs.

Data processing module 270 may store digital load data and/or digital measurement data, transmitted to base station 120 by remote load cell assembly 110, in memory 222 measurement data 282. Data processing module 270 may also store pairing data transmitted from remote load cell assembly 110 in memory 222 pairing data 280. In an embodiment, digital processing module 270 may access digital measurement data, including but not limited to digital temperature data and/or battery voltage data, and may use one or more battery life estimation algorithms to estimate the remaining battery life of one or more battery compartment 130 batteries. By way of example and not by way of limitation, a battery life estimation algorithm may incorporate temperature data over defined periods of time to estimate remaining battery life. Digital processing module 270 may store the estimated remaining battery life of one or more batteries in battery life data 286.

Emulation module 272 may access digital load data stored in measurement data 282. Emulation module 272 may generate emulation data, which emulator 224 uses to generate analog voltage data as described in greater detail below. Having generated emulation data, emulation module 272 stores the emulation data in emulation data 284.

In an embodiment, memory 222 comprises pairing data 280, measurement data 282, emulation data 284, and battery life data 286. Although FIG. 2 illustrates memory 222 comprising a single pairing data 280, measurement data 282, emulation data 284, and battery life data 286, embodiments contemplate memory 222 comprising any configuration of pairing data 280, measurement data 282, emulation data 284, battery life data 286, or other data, according to particular needs.

Pairing data 280 may comprise pairing data that permits base station 120 to wirelessly pair with and transmit data to remote load cell assembly 110. In an embodiment, pairing data 280 may comprise any form of unique device identification, including but not limited to Bluetooth device names, wireless addresses, and/or device profiles, that permits base station 120 to pair with and transmit data to remote load cell assembly 110.

Measurement data 282 comprises digital load data and digital measurement data transmitted from remote load cell assembly 110 to base station 120. Digital load data may comprise digital data corresponding to analog voltage data read from one or more remote load cell assembly 110 load cells 260. Digital measurement data may comprise digital data corresponding to one or more remote load cell assembly 110 sensor 216 readings, including but not limited to digital temperature data output by temperature sensor 264, digital accelerometer data output by accelerometer 262, and the like.

Emulation data 284 may comprise emulation data used by emulator 224 to generate analog voltage data for output through analog output channel 228. Battery life data 286 may comprise data recording the estimated charge level of the battery stored in remote load cell assembly 110 battery compartment 130. Base station 120 may output battery life data 286 using digital output channel 230.

In an embodiment, emulator 224 comprises a digital-to-analog converter and associated hardware configured to access digital emulation data stored in emulation data 284, convert emulation data 284 into analog voltage data which matches the original analog voltage data read by remote load cell assembly 110 sensors 216, and to output analog voltage data using analog output channel 228. In an embodiment, analog voltage data output by emulator 224 may comprise external excitation voltage supply with a signal referenced at half the excitation voltage, identical to external analog excitation voltage output by load cell 260 Wheatstone bridge.

In an embodiment, emulator 224 may comprise a reference generator that receives excitation voltage from one or more external power sources and is configured to offset the load cell signal to one half of the excitation voltage. As an example only and not by way of limitation, the reference generator excitation voltage is 5 volts, and the excitation voltage transmitted to emulator 224 is divided in half. In this example, the signal voltage output by emulator 224 identically matches the signal voltage that would be output by load cell 260 directly. In an embodiment, emulator 224 may access digital load data that is configured as millivolts per volt excitation, and may output analog voltage data configured as millivolts per volt excitation. In other embodiments, emulator 224 may be configured to output signal voltage at double the standard voltage to indicate one or more problems have occurred with remote load cell assembly 110 and/or base station 120.

In an embodiment, transceiver 226 comprises a transmitter configured to transmit digital data wirelessly and a receiver configured to receive digital data wirelessly. Transceiver 226 may further comprise antenna 227 configured to transmit and receive digital wireless signals to and from remote load cell assembly 110 at one or more frequencies and/or using one or more wireless communication 140 protocols.

In an embodiment, analog output channel 228 comprises one or more output channels configured to output analog voltage data generated by emulator 224. In an embodiment, analog output channel 228 comprises a cable further comprising negative and positive load cell signal channels and positive and negative load cell excitation channels. Although particular examples of analog output channel 228 are described herein, embodiments contemplate base station 120 outputting analog voltage data and/or analog signals in any configuration and through any cables or output channels, according to particular needs.

In an embodiment, digital output channel 230 comprises any digital channel and cable connector, including but not limited to a Universal Serial Bus USB-C connector, through which base station 120 may output digital data and/or digital signals.

In an embodiment, power connector 232 may supply electrical power to operate base station 120. In an embodiment, power connector 232 comprises a two-pin input connector configured to accept 10-32 volt direct current (DC) electrical power supplied by pump controller box 154.

Figure 3A:
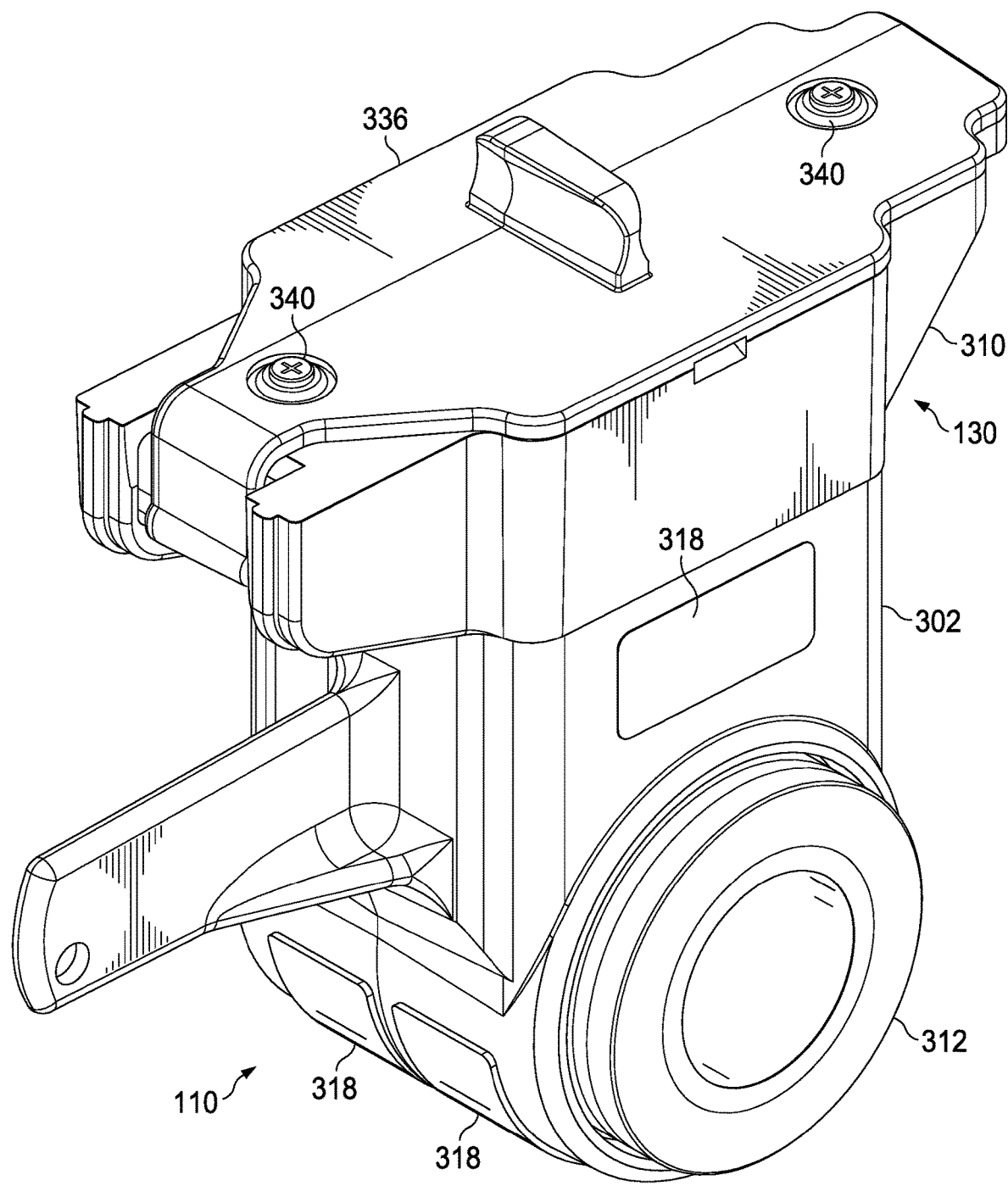
FIGS. 3A and 3B illustrate perspective and exploded views, respectively, of the remote load cell assembly and a battery compartment, according to embodiments.
Figure 3B:
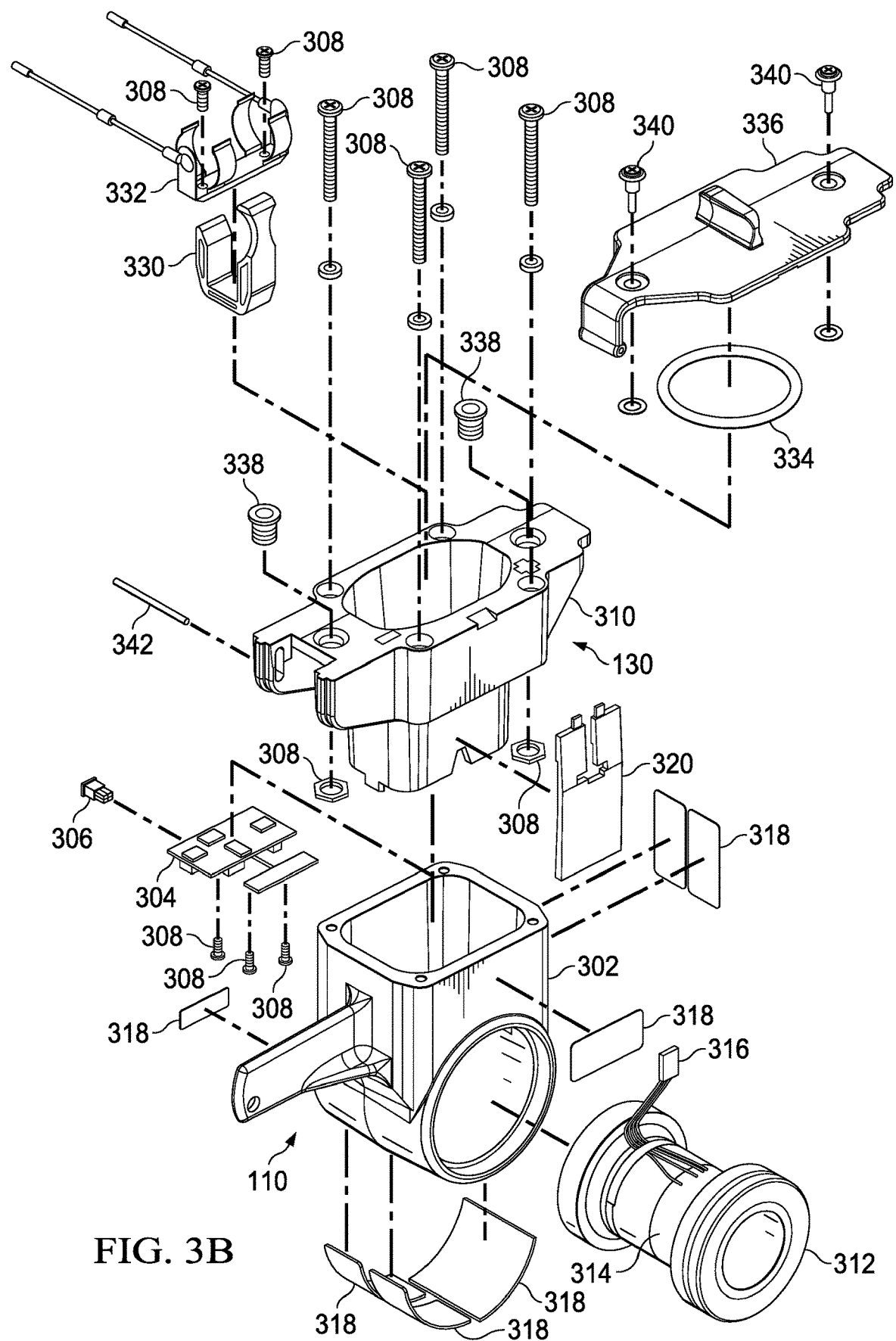

FIGS. 3A and 3B illustrate perspective and exploded views, respectively, of remote load cell assembly 110 and battery compartment 130, according to embodiments. In the embodiment illustrated by FIGS. 3A and 3B, remote load cell assembly 110 comprises wireless series cover 302, wireless remote board 304, power connector 306, fasteners 308, flexure 312, flex circuit 314, wire assembly 316, labels 318, and antenna cover 320. Although FIGS. 3A and 3B illustrate remote load cell assembly 110 wireless series cover 302, wireless remote board 304, power connector 306, fasteners 308, flexure 312, flex circuit 314, wire assembly 316, labels 318, and antenna cover 320 in a particular configuration, embodiments contemplate wireless load cell assemblies 110 of any configuration and comprising any components, according to particular needs.

In the embodiment illustrated by FIGS. 3A and 3B, battery compartment 130 comprises wireless battery case 310, battery puller 330, battery harness 332, O-ring 334, wireless battery case lid 336, camloc open receptacles 338, camloc heads 340, and hinge pin 342. Although FIGS. 3A and 3B illustrate battery compartment 130 wireless battery case 310, battery puller 330, battery harness 332, O-ring 334, wireless battery case lid 336, camloc open receptacles 338, camloc heads 340, and hinge pin 342 in a particular configuration, embodiments contemplate battery compartments 130 of any configuration and comprising any components, according to particular needs.

In an embodiment, remote load cell assembly 110 may comprise wireless series cover 302. Wireless series cover 302 may comprise wireless remote board 304. According to embodiments, one or more remote load cell assembly 110 components, including but not limited to processor 210, memory 212, analog-to-digital converter 214, one or more sensors 216, and/or transceiver 218, may be mounted to wireless remote board 304. Power connector 306 may connect wireless remote board 304 to one or more power sources, including but not limited to one or more battery compartment 130 batteries. One or more fasteners 308, may secure wireless remote board 304 to wireless series cover 302 and/or wireless battery case 310, according to embodiments.

Wireless series cover 302 may comprise flexure 312. Flexure 312 may connect remote load cell assembly 110 to polished rod 152 of pumpjack 150. Flexure 312 may comprise flex circuit 314 and wire assembly 316. According to embodiments, flexure 312 and/or flex circuit 314 may incorporate one or more load cells 260, including but not limited to one or more strain gauges 406, configured to detect strain measured at the location of polished rod 152. Wire assembly 316 may connect flex circuit 314 and one or more load cells 260 or other sensors 216 to wireless remote board 304. In an embodiment, wireless series cover 302 may comprise one or more labels 318. Labels 318 may indicate, for example, proper installation orientation for remote load cell assembly 110, device compliance with Federal Communications Commission (FCC) wireless transmission regulations, and/or any other form of information. In an embodiment, wireless series cover 302 may comprise antenna cover 320, which may provide cover for one or more transceiver 218 antennas 219 (not illustrated in FIGS. 3A and 3B).

In an embodiment, battery compartment 130 wireless battery case 310 may connect to remote load cell assembly 110 wireless series cover 302. One or more fasteners 308 may secure wireless battery case 310 to wireless series cover 302. Wireless battery case 310 may comprise battery puller 330, battery harness 332, O-ring 334, hinge pin 342, and wireless battery case lid 336. Camloc open receptacles 338 may be mounted to wireless battery case 310, and camloc heads 340 may pass through wireless battery case lid 336 and secure to camloc open receptacles 338, thereby securing wireless battery case lid 336 to wireless battery case 310.

In an embodiment, battery harness 332 may be secured to wireless battery case 310 by one or more fasteners 308. Wireless battery case lid 336 camloc heads 340 may be configured to disengage from camloc open receptacles 338 after two quarter turns of camloc heads 340, thereby permitting the rapid and easy removal of wireless battery case lid 336 from wireless battery case 310 and access to, or the removal/replacement of, one or more batteries connected to battery harness 332. In an embodiment, battery puller 330 may move battery harness 332 with respect to wireless battery case 310, facilitating battery extraction from or insertion into wireless battery case 310.

In an embodiment, O-ring 334 may abut wireless battery case 310 and wireless battery case lid 336, and may seal wireless battery case 310 against wireless battery case lid 336, when camloc heads 340 secure wireless battery case lid 336 to wireless battery case 310. Wireless battery case lid 336 and O-ring 334 may provide a full weather seal for all internal battery compartment 130 components against all outside adverse weather conditions. In an open configuration, in which camloc heads 340 are not currently securing wireless battery case lid 336 to wireless battery case 310, wireless battery case 310 may be configured such that no adverse weather elements, including but not limited to rain droplets, sand, or dust particulate matter, may reach wireless remote board 304 underneath wireless battery case 310. In an embodiment, and not illustrated by FIGS. 3A-3B, a single pair of insulated wires passes through weather-sealed apertures in wireless battery case 310 to connect the positive and negative terminals of battery harness 332 with power connector 306.

Figure 4A:
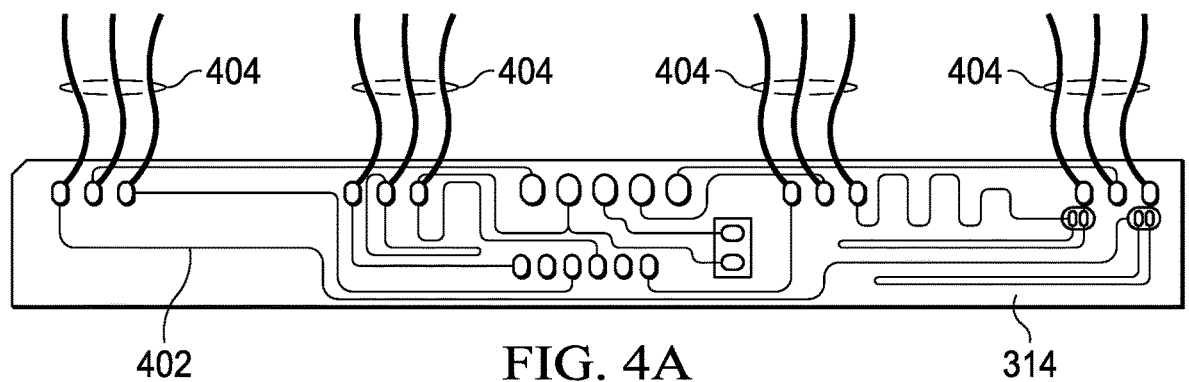
FIGS. 4A-4C illustrate a flex circuit, according to embodiments.
Figure 4B:
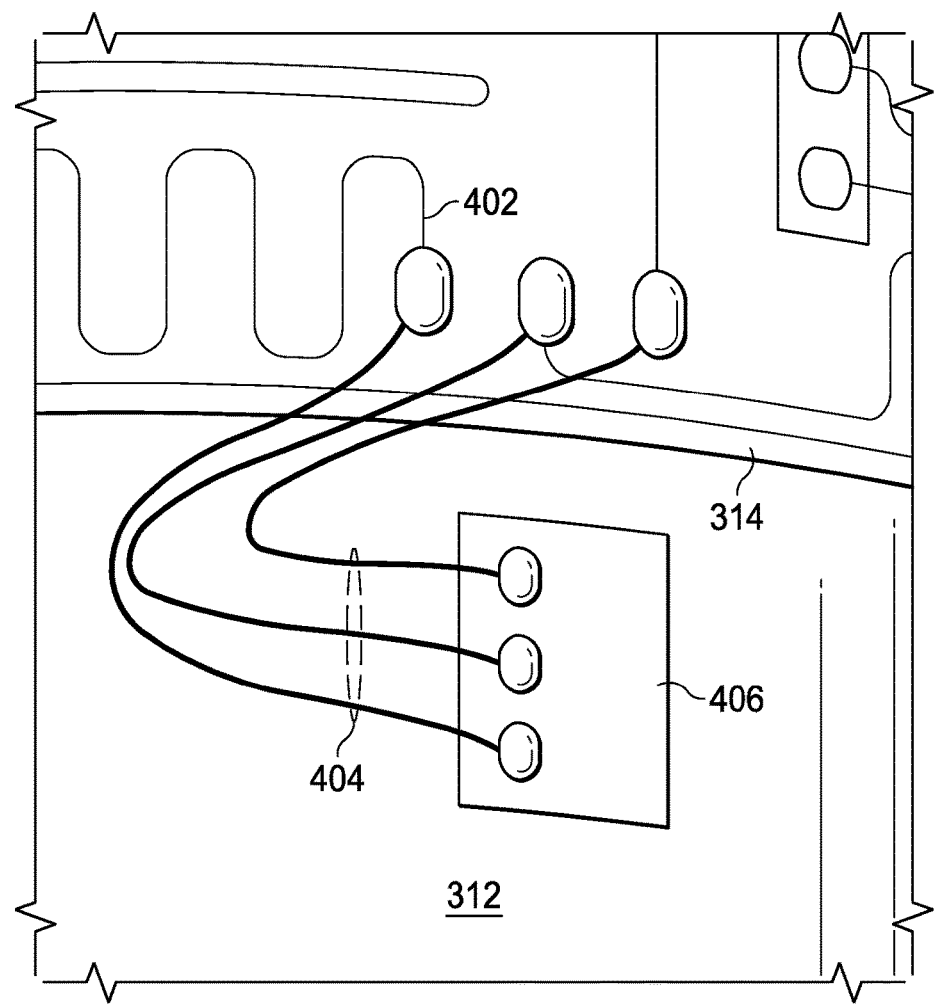
Figure 4C:
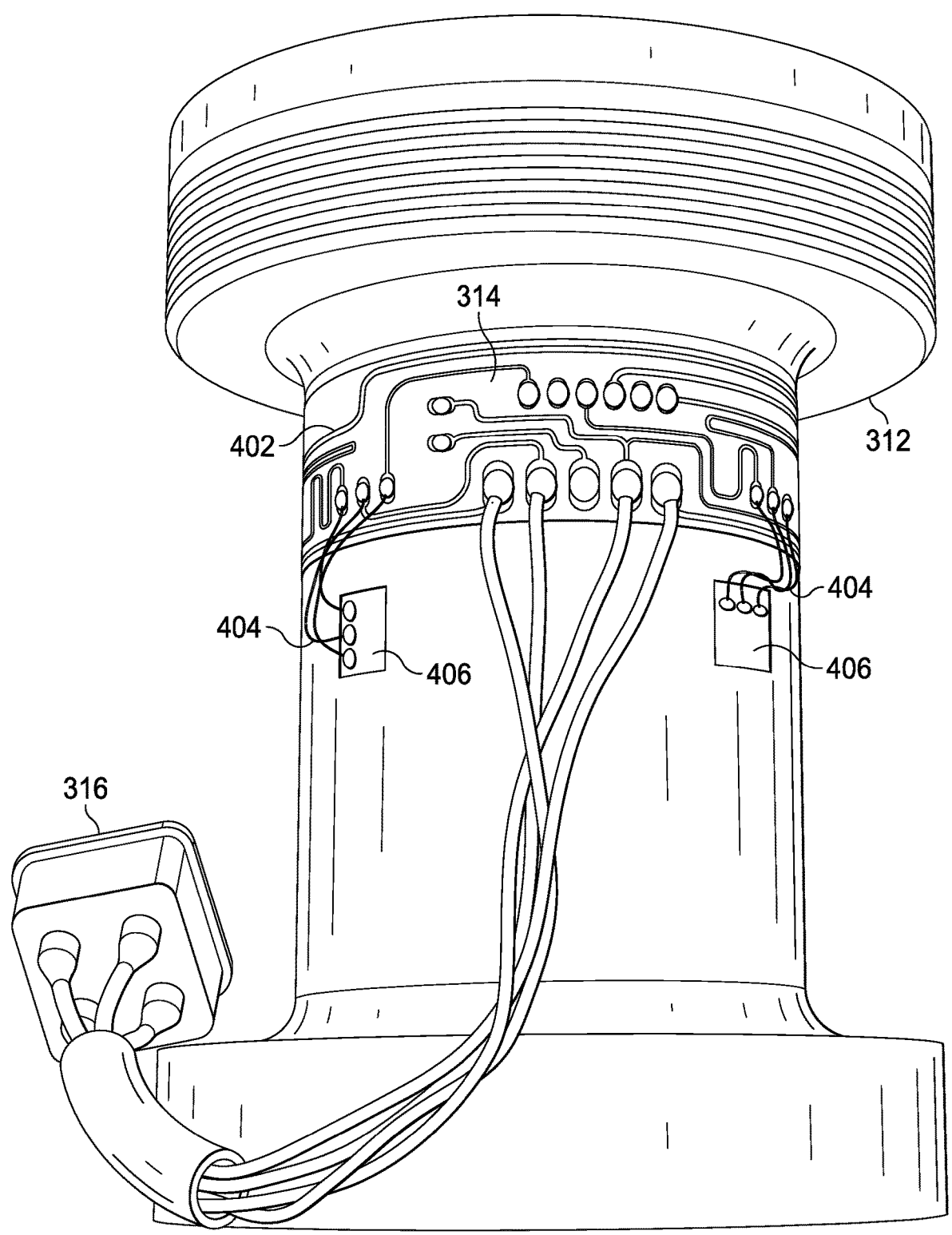

FIGS. 4A-4C illustrate flex circuit 314, according to embodiments. According to embodiments, flex circuit 314 may be mounted to flexure 312 and may be connected to wire assembly 316. Although FIGS. 4A-4C illustrate flex circuit 314 in particular configurations, and flex circuit 314 mounted to flexure 302 in particular configurations, embodiments contemplate flex circuits 314 and flexures 312 arranged in any configuration, according to particular needs.

In an embodiment, flex circuit 314 may comprise one or more conductor wires 402. Flex circuit may also comprise three or more strain gauge wires 404, configured to connect to one or more strain gauges 406, as illustrated by FIGS. 4B and 4C. In an embodiment, three strain gauge wires 404 connect each strain gauge 406 to flex circuit 314, wherein first strain gauge wire 404 carries positive signal voltage, second strain gauge wire 404 carries negative signal voltage, and third strain gauge wire 404 carries positive excitation voltage. In an embodiment, strain gauge 404 wires connect flex circuit 314 to four separate strain gauges 406 mounted to flexure 312.

According to embodiments, flex circuit 314, strain gauge wires 404, and strain gauges 406 may be calibrated during the production process to normalize resistance excitation voltage from strain gauge wires 404 and strain gauges 406. By way of example only and not by way of limitation, in an embodiment, factory assembly may (1) apply four strain gauges 406 to flexure 312, (2) apply flex circuit 314 to flexure 312, and (3) connect flex circuit 314 to strain gauges 406 using strain gauge wires 404. Continuing the example, the factory records the serial numbers of flexure 312 and/or flex circuit 314 to associate particular calibration actions and profiles with particular flexures 312 and/or flex circuits 314, and to facilitate troubleshooting of problems or strain gauge 406 measurement inaccuracies with respect to particular flexures 312 and/or flex circuits 314. Continuing with the example, pre-calibration weights are applied to flexure 312 to measure uncompensated strain gauge 406 excitation voltage output in response to pre-calibration weights. Flexure 312 is also heated and cooled in various temperature cycles to measure strain gauge 406 excitation voltage responses and changes in response to temperature cycles. In response to the measured uncompensated strain gauge 406 excitation voltage output, and/or the strain gauge 406 excitation voltage responses, flex circuit 314 and/or wireless remote board 304 (including but not limited to processor 210, memory 212, and analog-to-digital converter 214) may be calibrated to output a standard strain gauge 406 excitation voltage (such as 2 millivolts per volt excitation), and/or standard digital load data voltage measurement, in response to subjecting flexure 312 to a standard load of strain. Flex circuit 314 conductor wires 402 may comprise one or more compensation loops with jumpers that can be opened or closed to facilitate calibration. According to embodiments, because all remote load cell assemblies 110 are standardized to output a standard strain gauge 406 excitation voltage of 2 millivolts per volt excitation, any remote load cell assembly 110 may be paired with any base station 120 without requiring further calibration or standardization.

Figure 5:
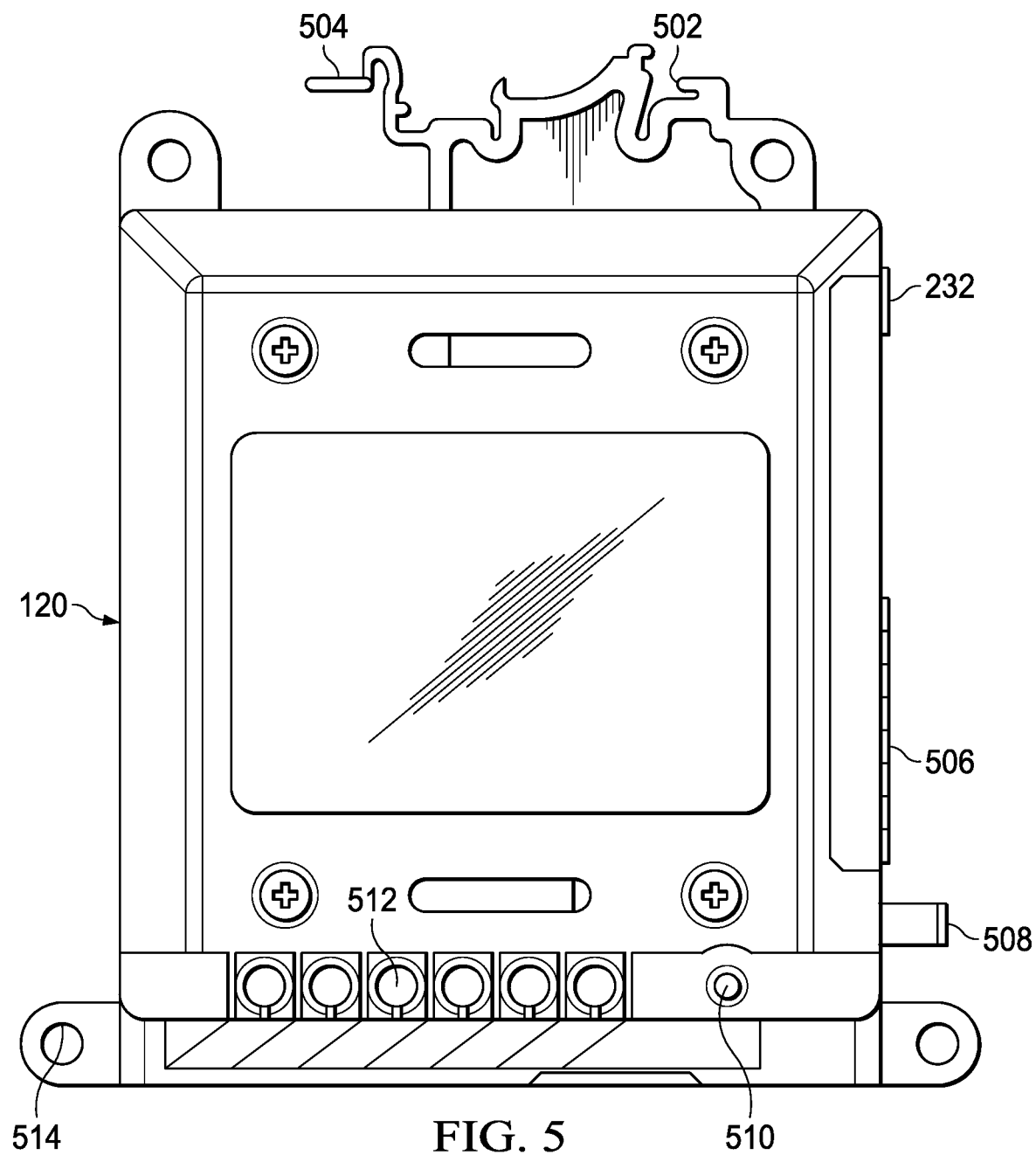
FIG. 5 illustrates the base station in greater detail, according to an embodiment.

FIG. 5 illustrates base station 120 in greater detail, according to an embodiment. Base station 120, according to embodiments, may comprise insert location for DIN rail 502, DIN rail release mount 504, power connector 232, signal connector 506, antenna connector 508, reset pairing button 510, LED user interface 512, and optional mounting hole 514. Although base station 120 is illustrated as comprising insert location for DIN rail 502, DIN rail release mount 504, power connector 232, signal connector 506, antenna connector 508, reset pairing button 510, LED user interface 512, and optional mounting hole 514 in a particular configuration, embodiments contemplate base station 120 comprising insert location for DIN rail 502, DIN rail release mount 504, power connector 232, signal connector 506, antenna connector 508, reset pairing button 510, LED user interface 512, optional mounting hole 514, and/or other components in any configuration, according to particular needs. Although not illustrated in FIG. 5, base station 120 may also comprise processor 220, memory 222, emulator 224, transceiver 226 and antenna 227, analog output channel 228, and digital output channel 230, as previously described.

In an embodiment, insert location for DIN rail 502, DIN rail release mount 504, and optional mounting hole 514 may facilitating the mounting of base station 120 pump controller box 154. In an embodiment, pump controller box 154 comprises one or more DIN rail mounts, to which insert location for DIN rail 502 and DIN rail release mount 504 may attach. Power connector 232 may supply power from pump controller box 154 to base station 120, such as, for example, in the form of a 12 volt power supply or a 24 volt power supply. In an embodiment, signal connector 506 may output from base station 120 one or more digital signals and/or one or more analog signals, such as but not limited to emulated load cell 260 excitation voltage. Base station 120 signal connector 506 may connect to one or more drive motors, drive controllers, or other pumpjack 150 control mechanisms housed in pump controller box 154, and base station 120 may accelerate or decelerate one or more drive motors, or otherwise exercise control over pumpjack 150 control machinery, in response to one or more signals transmitted from remote load cell assembly 110 to base station 120. In other embodiments, base station 120 may not be housed in pump controller box 154, and may be separately located at or within wireless transmission range of pumpjack 150.

According to embodiments, antenna connector 508 may connect base station 120 to one or more antennas 227 configured to receive transmitted signals from, and to transmit signals to, remote load cell assembly 110. Reset pairing button 510 may reset pairing data 280 and may permit base station 120 to pair with a new remote load cell assembly 110. LED user interface 512 may display one or more indicator lights that display information regarding base station 120 and/or remote load cell assembly 110, including but not limited to estimated remaining remote load cell assembly 110 battery life, pairing status of base station 120 to remote load cell assembly 110, or any other base station 120 and/or remote load cell assembly 110 information. In an embodiment, signal connector 506 may further comprise digital output channel 230, which may transmit one or more digital messages from base station 120, such as, for example, a warning that remote load cell assembly 110 calculated battery life is depleting.

Figure 6:
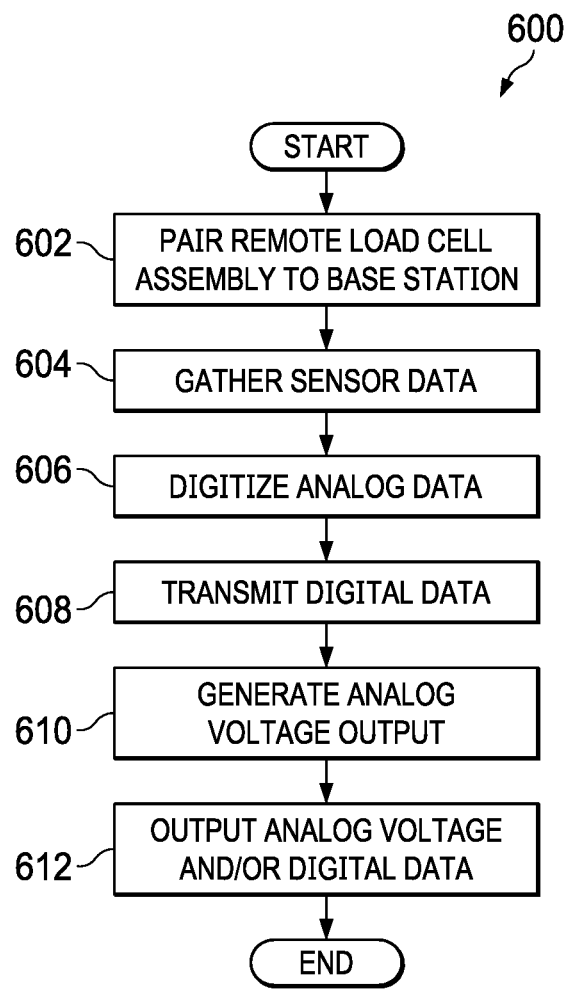
FIG. 6 illustrates an exemplary method of generating, transmitting, and receiving wireless load cell monitoring signals, in accordance with an embodiment.

FIG. 6 illustrates exemplary method 600 of generating, transmitting, and receiving wireless load cell monitoring signals, in accordance with an embodiment. Although actions of method 600 are described in a particular order, embodiments contemplate wireless load cell monitoring system 100 generating, transmitting, and receiving wireless signals of any configuration via actions in any suitable order or combination, according to particular needs.

At action 602, remote load cell assembly 110 pairs to base station 120. According to embodiments, remote load cell assembly 110 and base station 120 may execute action 602 to permit remote load cell assembly 110 and base station 120 to share information between one another in an environment comprising multiple transmitting remote load cell assemblies 110 and multiple base stations 120. In an embodiment, base station 120 data processing module 270 may use transceiver 226 and antenna 227 to transmit base station 120 pairing data, including but not limited to the name, wireless address, wireless operating frequency, wireless security PIN and/or device profile of base station 120, to remote load cell assembly 110. Antenna 219 of transceiver 218 receives the wireless transmission of base station 120 pairing data, and remote load cell assembly 110 data gathering module 240 stores base station 120 pairing data in pairing data 250. Similarly, remote load cell assembly 110 data processing module 242 may use transceiver 218 antenna 219 to transmit remote load cell assembly 110 pairing data, including but not limited to the name, wireless address, wireless operating frequency, wireless security PIN, and/or device profile of remote load cell assembly 110, to base station 120. Antenna 227 of transceiver 226 receives the wireless transmission of remote load cell assembly 110 pairing data, and base station 120 data processing module 270 stores remote load cell assembly 110 pairing data in pairing data 280.

At action 604, remote load cell assembly 110 gathers data from one or more sensors 216. In an embodiment, data gathering module 240 transmits electrical power from battery compartment 130 battery to one or more remote load cell assembly 110 sensors 216. In embodiments in which one or more sensors 216 comprise digital sensors 216, such as, for example, digital accelerometers 262 or digital temperature sensors 264, data gathering module 240 may gather digital measurement data from one or more sensors 216 and may store digital measurement data in sensors data 252. Having gathered digital measurement data from one or more sensors 216, data gathering module 240 may discontinue electrical power transmission to one or more sensors 216. Embodiments contemplate data gathering module 240 gathering and storing digital measurement data from any configuration of sensors 216 mounted to remote load cell assembly 110, according to particular needs. In an embodiment, remote load cell assembly 110 may collect one or more sensor 216 readings at a frequency of one hundred times a second, and may transmit the one or more sensor 216 readings to base station 120 digitally at a frequency of fifty times a second, to conserve remote load cell assembly 110 battery power. In other embodiments, remote load cell assembly 110 may collect one or more sensor readings, and may transmit one or more sensor readings to base station 120, at any frequencies.

At action 606, remote load cell assembly 110 digitizes analog data by converting analog voltage data (such as, for example, as output by one or more load cells 260) into digital load data. In an embodiment, analog-to-digital converter 214 reads analog voltage data from one or more sensors 216, including but not limited to one or more load cells 260. Analog to digital-converter 214 converts the analog voltage data into digital load data and stores the digital load data in sensors data 252. In an embodiment, analog-to-digital converter 214 may read excitation voltage transmitted by one or more load cells 260, output a number in analog-to-digital counts, and scale the number to millivolts per volt excitation. In an embodiment, analog-to-digital converter 214 is calibrated to 2 millivolts per volt excitation, wherein maximum load applied to one or more load cells 260 is calibrated to read 2 millivolts per volt excitation. Although the present disclosure primarily describes and illustrates embodiments of analog-to-digital converter 214 digitizing load cell 260 analog voltage data, analog-to-digital converter 214 is in no way limited to operating in conjunction with load cells 260 preferentially or exclusively. Embodiments contemplate analog-to-digital converter converting analog signals of any configuration, and output by any sensor 216, into digital data, according to particular needs.

At action 608, remote load cell assembly 110 transmits digital load data and/or digital measurement data to base station 120. In an embodiment, data processing module 242 accesses digital load data and/or digital measurement data stored in sensors data 252. Data processing module 242 transmits the digital load data and/or digital measurement data to transceiver 218. Transceiver 218 transmits, via antenna 219, the digital load data and/or digital measurement data, using wireless communication 140, to base station 120 transceiver 226 antenna 227. In an embodiment, transceiver 218 and antenna 219 are configured to utilize very low power overhead burst transmission protocols to reduce remote load cell assembly 110 battery depletion and to minimize necessary transceiver 218 and antenna 219 power consumption. In an embodiment, remote load cell assembly 110 may collect one or more sensor readings at a frequency of one hundred times a second and may transmit the one or more sensor readings to base station 120 digitally at a frequency of fifty times a second, to conserve remote load cell assembly 110 battery power. Base station 120 data processing module 270 stores the digital load data and/or digital measurement data in measurement data 282.

At action 610, base station 120 generates analog voltage output by emulating the original analog voltage data read by remote load cell assembly 110. In an embodiment, emulation module 272 accesses digital load data stored in measurement data 282. Emulation module 272 configures digital load data into emulation data which emulator 224 may use to generate analog voltage data for output which matches the original analog voltage data read by remote load cell assembly 110 sensors 216. Emulation module 272 stores the emulation data in emulation data 284. In an embodiment, emulator 224 comprises a reference generator that receives excitation voltage from one or more external power sources and is configured to offset the load cell signal to one half of the excitation voltage. In this embodiment, the reference generator excitation voltage is 5 volts, and the excitation voltage transmitted to emulator 224 is divided in half. In this embodiment, the signal voltage output by emulator 224 identically matches the signal voltage that would be output by load cell 260 directly.

At action 612, base station 120 outputs analog voltage data and/or digital measurement data. In an embodiment, emulator 224 accesses emulation data 284, and generates analog voltage data for output which matches the original analog voltage data read by remote load cell assembly 110 sensors 216. Base station 120 outputs the emulated analog voltage data from base station 120 using analog output channel 228. In an embodiment, data processing module 270 accesses the digital measurement data stored in measurement data 282, and transmits the digital measurement data from base station 120 using digital output channel 230. Wireless load cell monitoring system 100 then terminates method 600.

To illustrate the operation of wireless load cell monitoring system 100 executing the actions of method 600, the following expanded example is provided. In this example, wireless load cell monitoring system 100 executes the actions of method 600 to read load cell 260 analog voltage data and temperature sensor 264 and voltage sensor 266 digital measurement data from remote load cell assembly 110 connected to pumpjack 150 polished rod 152 as pumpjack 150 operates to extract oil from an oil well. Although wireless load cell monitoring system 100 executes the actions of method 600 in a particular order and with regard to load cell 260, temperature sensor 264, and voltage sensor 266 data measured at the location of an operating polished rod 152, embodiments contemplate wireless load cell monitoring system 100 executing the actions of method 600 in any order and to read any form of sensors 216 data from remote load cell assembly 110 affixed to any location or device, according to particular needs.

Continuing with the example, and at action 602, remote load cell assembly 110, which in this example is connected to polished rod 152, pairs with base station 120, which in this example is connected to pump controller box 154. Base station 120 data processing module 270 uses transceiver 226 to transmit base station 120 pairing data, including but not limited to the name, wireless address, wireless operating frequency, wireless security PIN and/or device profile of base station 120, to remote load cell assembly 110. In this example, base station 120 transmits base station 120 pairing data using Bluetooth wireless communication 140 protocol. Transceiver 218 receives the Bluetooth wireless transmission of base station 120 pairing data, and remote load cell assembly 110 data gathering module 240 stores base station 120 pairing data in pairing data 250. Similarly, remote load cell assembly 110 data processing module 242 uses transceiver 228 to transmit remote load cell assembly 110 pairing data, including but not limited to the name, wireless address, wireless operating frequency, wireless security PIN, and/or device profile of remote load cell assembly 110, to base station 120 using Bluetooth wireless communication 140 protocol. Transceiver 226 receives the Bluetooth wireless transmission of remote load cell assembly 110 pairing data, and base station 120 data processing module 270 stores remote load cell assembly 110 pairing data in pairing data 280.

Continuing with the example, at action 604, remote load cell assembly 110 gathers digital measurement data from temperature sensor 264 and voltage sensor 266. In an embodiment, data gathering module 240 activates temperature sensor 264 and voltage sensor 266 by transmitting electrical power from battery compartment 130 battery to temperature sensor 264 and voltage sensor 266. Data gathering module 240 gathers digital measurement data from temperature sensor 264 and voltage sensor 266, and stores digital measurement data in sensors data 252. Having gathered digital measurement data from temperature sensor 264 and voltage sensor 266, data gathering module 240 discontinues electrical power transmission to temperature sensor 264 and voltage sensor 266 to conserve battery power. In the embodiment illustrated by this continued example, data gathering module 240 activates temperature sensor 264 and voltage sensor 266, gathers digital measurement data, and discontinues electrical power transmission to temperature sensor 264 and voltage sensor 266 once every twenty-four hours to conserve electrical power. In other embodiments not illustrated by this example, data gathering module 240 activates, gathers data from, and deactivates sensors 216 at any frequency, including but not limited to once a minute, once an hour, or once a week, according to particular needs.

Continuing with this example, and at action 606, remote load cell assembly 110 digitizes analog data by converting analog voltage data from load cell 260 into digital load data. Analog-to-digital converter 214 reads analog voltage data from load cell 260 and converts the analog voltage data into digital load data, storing the digital load data in sensors data 252. In the embodiment illustrated by this continued example, analog-to-digital converter 214 reads load cell 260 analog voltage data and converts the analog voltage data into digital load data once every second. In other embodiments not illustrated by this example, analog-to-digital converter 214 reads analog voltage data from one or more sensors 216 at any frequency, including but not limited to once a minute, once an hour, or once a day, according to particular needs.

Continuing with this example, and at action 608, remote load cell assembly 110 transmits digital load data corresponding to load cell 260 analog voltage data, and digital measurement data corresponding to temperature sensor 264 and voltage sensor 266 data, to base station 120. Data processing module 242 accesses digital load data and digital measurement data stored in sensors data 252. In this example, data processing module 242 transmits digital load data and digital measurement data to transceiver 218. Transceiver 218 transmits digital load data and digital measurement data to base station 120 transceiver 226 using, in this continued example, unidirectional low-power ESB wireless data packet protocol. Base station data processing module 270 stores digital load data and digital measurement data in measurement data 282. In other embodiments not illustrated by this example, remote load cell assembly 110 may transmit digital load data and/or digital measurement data to base station 120 using any wireless communication 140 protocol.

Continuing with this example, and at action 610, base station 120 generates analog voltage output by emulating the original analog voltage data read by remote load cell assembly 110 load cell 260. Emulation module 272 accesses digital load data stored in measurement data 282. Emulation module 272 configures digital load data into emulation data which emulator 224 may use to generate analog voltage data for output which matches the original analog voltage data read by remote load cell assembly 110 sensors 260. Emulation module 272 stores the emulation data in emulation data 284.

Concluding with this example, and at action 612, base station 120 outputs analog voltage data and digital measurement data. Emulator 224 accesses emulation data 284 and generates analog voltage data for output which matches the original analog voltage data read by remote load cell assembly 110 load cell 260. Base station 120 outputs the emulated analog voltage data from base station 120 using analog output channel 228. Data processing module 270 accesses the digital measurement data stored in measurement data 282, and transmits the digital measurement data from base station 120 using digital output channel 230. In this example, data processing module 270 also accesses the digital measurement data corresponding to temperature sensor 264 and voltage sensor 266, and uses an algorithm to calculate the estimated remaining battery life of battery compartment 130 battery based on declining battery voltage over time and exposure to temperature extremes. Data processing module 270 stores the estimated remaining battery life of battery compartment 130 battery in battery life data 286, and outputs the estimated battery life using digital output channel 230 USB-C connector. Wireless load cell monitoring system 100 then terminates method 600.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A pumpjack wireless load cell monitoring system, comprising:
   a remote load cell assembly and a base station, wherein the remote load cell assembly comprises a remote processor, wherein the remote processor further comprises a data gathering module, a remote memory, a battery, a remote transceiver, an analog-to-digital converter, and a group of sensors comprising: a load cell comprising a wheatstone bridge circuit, an accelerometer, and a temperature sensor, wherein the remote load cell assembly is configured to operate in a hazardous environment selected from a group consisting of: a hazardous gas environment, a hazardous vapor environment, and a hazardous mist environment; the remote load cell assembly is further configured to:
   pair with the base station using a wireless communication protocol;
   read digital data output by the accelerometer and the temperature sensor;
   read original analog voltage data from the load cell attached to a rod of a pumpjack, wherein the load cell measures pumping force of the pumpjack;
   read digital measurement data from the accelerometer and the temperature sensor;
   convert the load cell original analog voltage data into digital load data; and
   transmit the digital load data from the remote load cell assembly and the digital measurement data from the accelerometer and the temperature sensor to the base station;
   deactivate, by the data gathering module, the group of sensors and the remote transceiver to perform the pair, read, convert and transmit steps once an hour or once a day, when required to manage battery consumption of the remote load cell assembly; and
   the base station comprises a base processor, a base memory, a base transceiver, and a digital-to-analog converter, and is configured to:
   convert the digital load data corresponding to the load cell into emulated analog voltage data that matches the original analog voltage data; and
   output the emulated analog voltage data, the accelerometer data and temperature data.

2. The pumpjack wireless load cell monitoring system of claim 1, further comprising the remote load cell assembly comprising one or more digital sensors, and wherein:
   the remote load cell assembly transmits digital measurement data from the one or more digital sensors to the base station; and
   the base station outputs the digital measurement data.

3. The pumpjack wireless load cell monitoring system of claim 1, further comprising the remote load cell assembly comprising a battery voltage sensor, and wherein:
   the remote load cell assembly transmits battery voltage data from the one or more digital sensors to the base station;
   the base processor estimates remaining battery life using battery voltage data; and
   the base station outputs the estimated remaining battery life.

4. The pumpjack wireless load cell monitoring system of claim 1, wherein the wireless communication protocol comprises one or more communication protocols selected from the list of:
   Enhanced Shock Burst wireless data packet protocol;
   Bluetooth wireless protocol; and
   ZigBee wireless protocol.

5. A computer-implemented method for monitoring a pumpjack, comprising:
   wirelessly pairing a remote load cell assembly comprising a remote processor, wherein the remote processor further comprises a data gathering module, remote memory, battery, remote transceiver, analog-to-digital converter, and a group of sensors comprising: a load cell comprising a wheatstone bridge circuit, an accelerometer, and a temperature sensor; wherein the remote load cell assembly is configured to operate in a hazardous environment from a group consisting of: a hazardous gas environment, a hazardous vapor environment, and a hazardous mist environment; with a base station comprising a base processor, base memory, base transceiver, and digital-to-analog converter;
   reading digital data output by the accelerometer and the temperature sensor;
   reading original analog voltage data from the load cell attached to a rod of a pumpjack, wherein the load cell measures pumping force of the pumpjack;
   reading digital measurement data from the accelerometer and the temperature sensor;
   converting the load cell original analog voltage data into digital load data;
   transmitting the digital load data from the remote load cell assembly and the digital measurement data from the accelerometer and the temperature sensor to the base station using a wireless communication protocol;
   deactivating, by the data gathering module, the group of sensors and the remote transceiver to perform the pair, read, convert and transmit steps once an hour or once a day, when required to manage battery consumption of the remote load cell assembly;
   converting the digital load data corresponding to the load cell into emulated analog voltage data that matches the original analog voltage data; and
   outputting from the base station the emulated analog voltage data, the accelerometer data and temperature data.

6. The method of claim 5, further comprising:
   transmitting digital measurement data from one or more digital sensors mounted to the remote load cell assembly to the base station using a wireless communication protocol; and
   outputting from the base station the digital measurement data.

7. The method of claim 5, further comprising:
   transmitting battery voltage data from the one or more remote load cell assembly digital sensors to the base station using a wireless communication protocol;
   estimating remaining battery life using battery voltage data; and
   outputting from the base station the estimated remaining battery life.

8. The method of claim 5, wherein the wireless communication protocol comprises one or more communication protocols selected from the list of:
   Enhanced Shock Burst wireless data packet protocol;

Bluetooth wireless protocol; and

ZigBee wireless protocol.

9. A non-transitory computer-readable storage medium embodied with software for monitoring a pumpjack, the software when executed configured to:

wirelessly pair a remote load cell assembly comprising a remote processor, wherein the remote processor further comprises a data gathering module, remote memory, battery, remote transceiver, analog-to-digital converter, and a group of sensors comprising: a load cell comprising a wheatstone bridge circuit, an accelerometer, and a temperature sensor, wherein the remote load cell assembly is configured to operate in a hazardous environment from a group consisting of: a hazardous gas environment, a hazardous vapor environment, and a hazardous mist environment; with a base station comprising a base processor, base memory, base transceiver, and digital-to-analog converter;

reading digital data output by the accelerometer and the temperature sensor;

read original analog voltage data from the load cell attached to a rod of a pumpjack, wherein the load cell measures pumping force of the pumpjack;

reading digital measurement data from the accelerometer and the temperature sensor;

convert the load cell original analog voltage data into digital load data;

transmit the digital load data from the remote load cell assembly and the digital measurement data from the accelerometer and the temperature sensor to the base station using a wireless communication protocol;

deactivating, by the data gathering module, the group of sensors and the remote transceiver to perform the pair, read, convert and transmit steps once an hour or once a day, when required to manage battery consumption of the remote load cell assembly;

convert the digital load data corresponding to the load cell into emulated analog voltage data that matches the original analog voltage data; and output the emulated analog voltage data, the accelerometer data and temperature data from the base station.

10. The non-transitory computer-readable storage medium of claim 9, wherein the software when executed is further configured to:

transmit digital measurement data from one or more digital sensors mounted to the remote load cell assembly to the base station using a wireless communication protocol; and output from the base station the digital measurement data.

11. The non-transitory computer-readable storage medium of claim 9, wherein the software when executed is further configured to:

transmit battery voltage data from the one or more remote load cell assembly digital sensors to the base station using a wireless communication protocol;

estimate remaining battery life using battery voltage data; and output from the base station the estimated remaining battery life.

12. The non-transitory computer-readable storage medium of claim 9, wherein the wireless communication protocol comprises one or more communication protocols selected from the list of:

Enhanced Shock Burst wireless data packet protocol;

Bluetooth wireless protocol; and

ZigBee wireless protocol.

\* \* \* \* \*